Nov. 29, 1960  C. J. EDWARDS, JR  2,961,819
COTTON PICKER

Filed Oct. 2, 1957  3 Sheets-Sheet 1

INVENTOR.
CYRIL J. EDWARDS, JR.
BY
Gregory S. Dolgorukov
ATTORNEY

Nov. 29, 1960  C. J. EDWARDS, JR  2,961,819
COTTON PICKER

Filed Oct. 2, 1957  3 Sheets-Sheet 2

INVENTOR.
CYRIL J. EDWARDS, JR.
BY
Gregory S. Dolgorusov
ATTORNEY

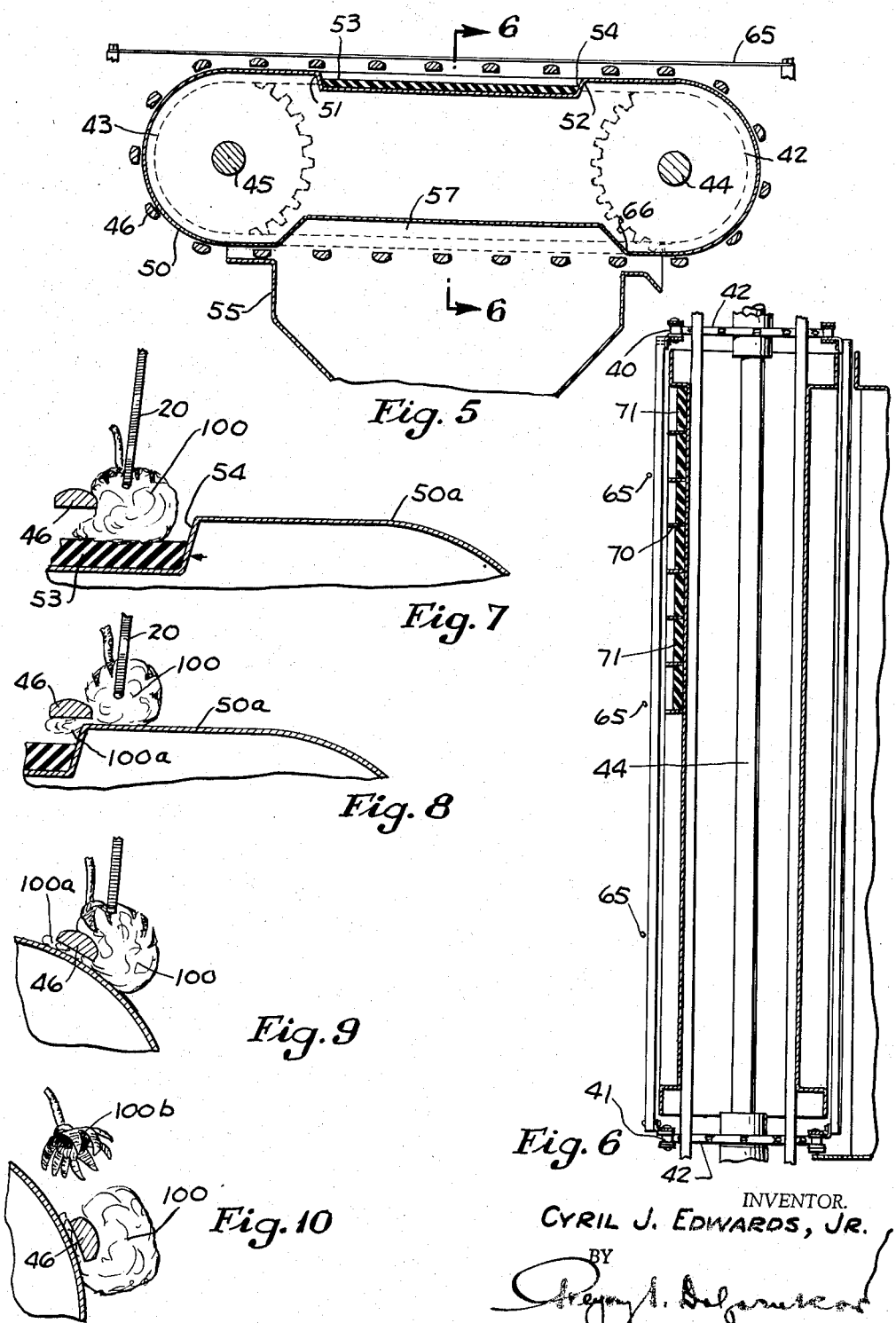

United States Patent Office 2,961,819
Patented Nov. 29, 1960

2,961,819

COTTON PICKER

Cyril J. Edwards, Jr., 35 McKinley Road, Grosse Pointe Farms 36, Mich.

Filed Oct. 2, 1957, Ser. No. 687,748

5 Claims. (Cl. 56—30)

This invention relates to cotton pickers.

In spite of a strenuous search for providing a machine for picking cotton, which search has been going on for almost a century, and numerous attempts to produce an efficient, simple and inexpensive cotton picking machine, no machine fully satisfying the small farmers' practical requirements for such a machine has yet been produced.

As a result, a small cotton farmer still does not have available to him a simple, relatively inexpensive machine that would pick his cotton thoroughly and cleanly enough, i.e. without leaving too much unpicked cotton in the field and without having so much trash in the picked cotton as to cause its downgrading at the receiving point. Therefore, picking cotton by hand still remains the most universally used method of cotton picking on smaller plantations or farms.

One of the objects of the present invention is to provide a cotton picking machine based on a novel concept providing for constructing a simple and practical machine.

Another object of the present invention is to provide a cotton picking machine comprising, generally, a cotton boll feeding unit and a cotton fibers separating unit, which units can be used in combination with each other, or separately in combination with units having complementary function, and operating to produce desired results.

A further object of the present invention is to provide a cotton picking machine or cotton picker including a boll feeding unit adapted to bring cotton bolls in contact with the cotton fibers separating unit without feeding foliage and branches of the cotton plant to the fibers separating unit in a manner that might cause engagement of such foliage and its separation and mixing with the cotton.

A still further object of the present invention is to provide a boll feeding unit including a plurality of feeding fingers adapted to penetrate through the cotton plant by going around the branches and by bending the leaves of the plant but pushing in front of themselves cotton bolls that may be met by such fingers.

A still further object of the present invention is to provide means to cause such feeding fingers to remain stationary with respect to the plant in the line of movement of the cotton picker and to move only transversely to such line of movement of the cotton picker and toward the fibers separating unit.

A still further object of the present invention is to provide boll feeding fingers which have no tendency to produce snags and do not catch the cotton fibers on withdrawal from contact with a cotton boll but separate or break from the cotton fibers cleanly and without dragging or pulling the same.

A still further object of the present invention is to provide boll feeding fingers made of coil springs, novel means being provided to prevent straining the fingers at their roots.

A still further object of the present invention is to provide a cotton picker comprising a boll feeding unit and a fibers separating unit having means engaging the cotton fibers as they are brought in contact with the separating means by the boll feeding unit which engagement is sufficient as to its strength and duration to ensure separation of the cotton fibers when the same are made to move relative to the bur or hull.

A still further object of the present invention is to impart to the engaged cotton fibers a movement relative to the hull, which movement is of such nature, direction and duration as to ensure clean separation of the cotton fibers from the hull.

A still further object of the present invention is to provide a fibers separating unit of the nature specified above and including foliage-excluding means preventing penetration of cotton plant foliage and branches into the fibers separating unit as well as engagement of such foliage and branches by the fibers separating means.

A still further object of the present invention is to provide an improved cotton picking machine of the nature specified above and including cotton delivery means or unit adapted to deliver the separated cotton fibers into a receptacle or collector.

It is an added object of the present invention to provide a cotton picker of the nature specified above, which is relatively simple in construction, dependable in operation, and is relatively inexpensive to manufacture and to service.

Further objects and advantages of this invention will be apparent from the following description and appended claims, reference being had to the accompanying drawings forming a part of this specification, wherein like reference characters designate corresponding parts in the several views.

Fig. 5 is a sectional view on an enlarged scale of the combined fibers separating and delivery unit, said view being taken in the direction of the arrows on the section plane passing through the line 5—5 of Fig. 1.

Fig. 6 is a sectional view taken in the direction of the arrows on the section plane passing through the line 6—6 of Fig. 5.

Fig. 7 shows a portion of the separating unit, with parts broken away and shown in section, having a bar contacting the cotton fibers in a boll being pushed by one of the feeding fingers.

Fig. 8 illustrates the relative positions of the operative elements of the cotton picker when the cotton fibers of the cotton boll are engaged by the separation bar.

Fig. 9 illustrates the operative elements at the moment of the operative cycle when the cotton fibers engaged by the separation bar are about to be pulled out or separated from the hull.

Fig. 10 illustrates the operative elements at the operative cycle immediately after the separation of the cotton fibers from the hull.

It is to be understood that the invention is not limited in its application to the details of construction and arrangement of parts illustrated in the accompanying drawings, since the invention is capable of other embodiments and of being practiced or carried out in various ways. Also, it is to be understood that the phraseology and terminology employed herein is for the purpose of description and not of limitation.

Figure 1:
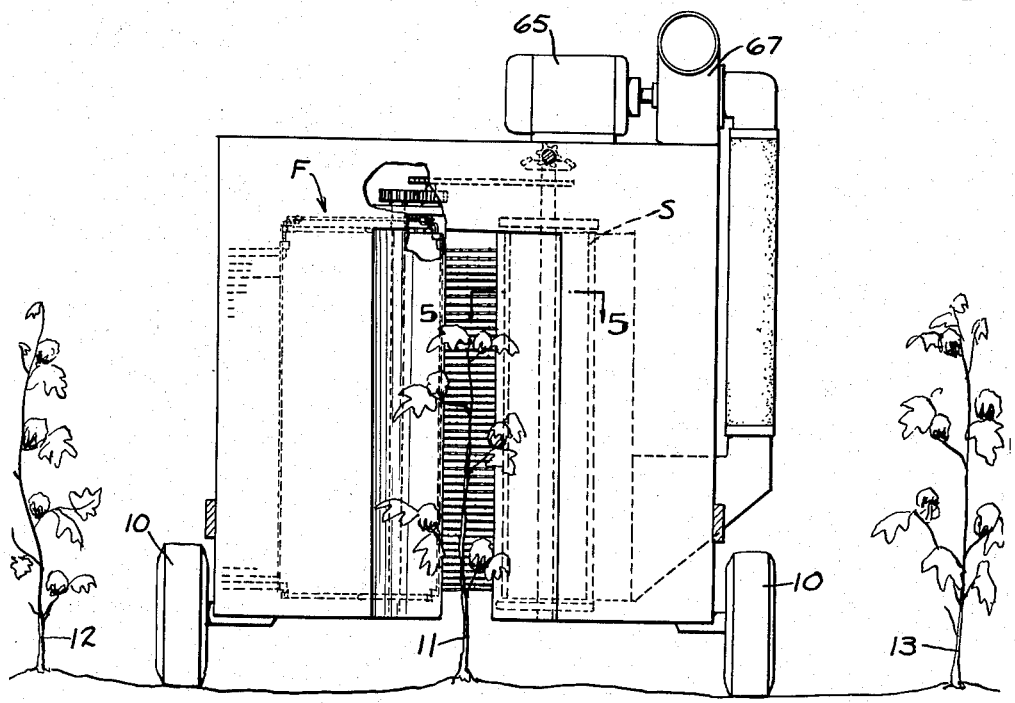
Fig. 1 is a front view of the cotton picker embodying the present invention, shown in an operative position and straddling one row of cotton plants.

In the drawings there is shown by way of example a cotton picker embodying the present invention. The cotton picker illustrated herein is shown in its entirety in Figs. 1 and 2. In the embodiment illustrated in said figures, the cotton picker is in the form of an implement mounted to roll on wheels 10 to straddle a row of cotton generally indicated by the numeral 11, with the wheels 10 running between the rows 11 and 12 and 11 and 13, respectively. As an implement, the cotton picker may be pulled or pushed through the field by a tractor, not shown, or it may be moved along the rows of cotton with the aid of any other suitable means.

Figure 2:
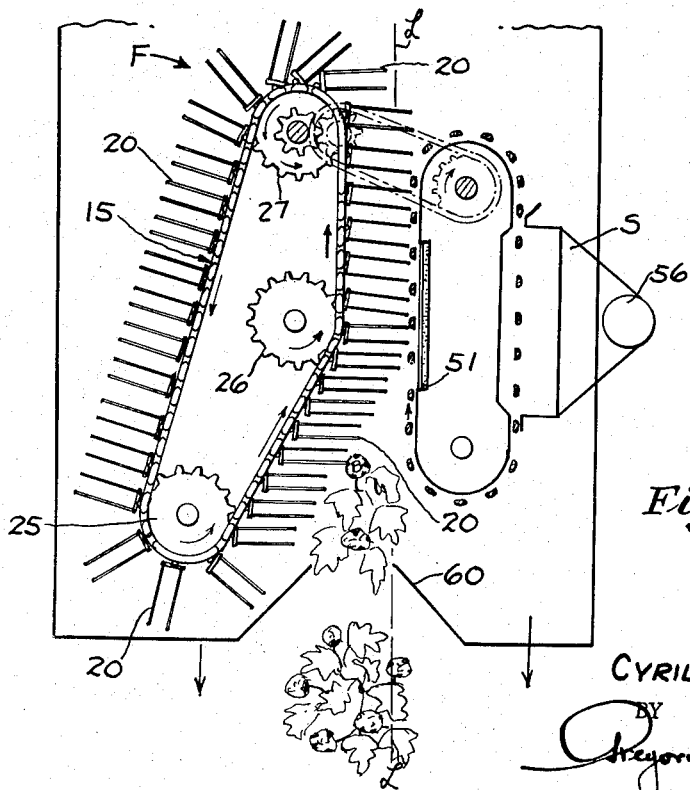
Fig. 2 is a plan view of the cotton picker of Fig. 1 with parts omitted and other parts broken away and shown in section with one cotton plant about to be embraced by the cotton picker indicated in front thereof.

The cotton picker comprises a boll feeding unit generally indicated by the letter F and a fibers separating unit with cotton delivery means generally designated by the letter S. The units F and S are mounted adjacent to each other to come in actual operative contact substantially along the line L—L, as is best shown in Fig. 2.

Figure 3:
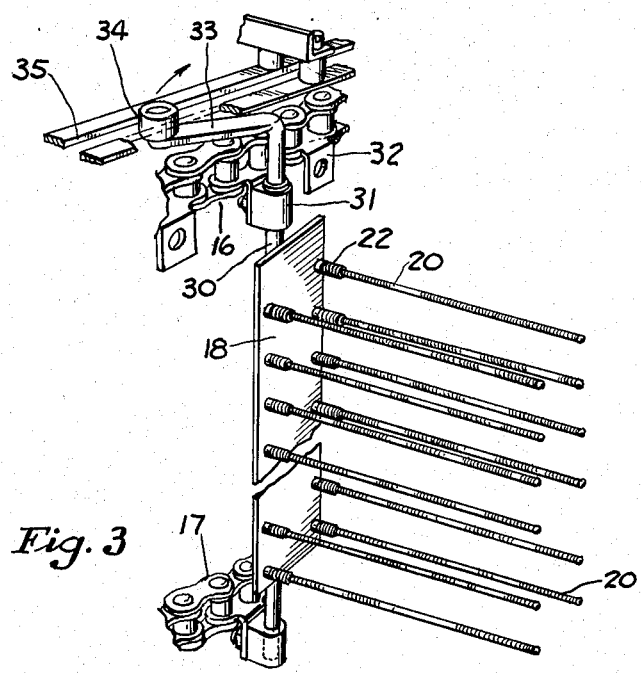
Fig. 3 is an enlarged fragmentary perspective view illustrating one plate of the endless connector forming a part of the boll feeding unit, the middle portion of said plate being broken away for the sake of compactness of the drawing.
Figure 4:
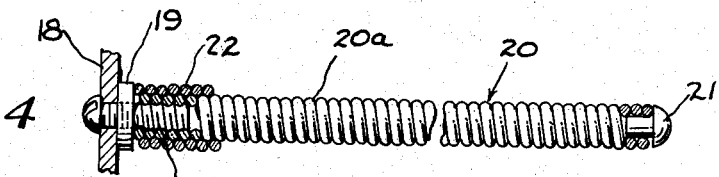
Fig. 4 illustrates one flexible finger on an enlarged scale with portions broken away and shown in section, a plurality of which are shown in Fig. 3.

The boll feeding unit comprises a flexible endless connector assembly 15 which, in the present embodiment of the invention, includes an upper chain 16 and a lower chain 17, see Fig. 3, carrying vertically extending plates 18 conected to said chains 16 and 17 in a manner described in detail below.

The endless connector 15 has provided thereon in a brush-like arrangement a large plurality of fingers 20. In the present embodiment of the invention said fingers are resilient and are in the form of steel coil springs. Each of said fingers 20 has its free end provided with a round-headed plug 21 while its other end is secured in any suitable manner to the plate 18. In the present embodiment, a stud 19 is riveted to the plate 18, and its stem 19a receives the end of the sprnig 20a. The end of said spring 20a so connected to the plate 18 carries a shorter steel spring 22 operating to decrease straining of the secured end of the finger 20. Fingers of such construction are easily bendable or deflectable, but they tend to straighten themselves out as soon as the external force causing their bending is removed.

A finger of this general nature, when pushed through the cotton plant, will penetrate the same, going around branches and leaf stems and bending or pushing aside the leaves as it passes by. However, when the rounded end of such a finger meets a flock of cotton fibers, it compresses the cotton and will push the cotton and therefore the entire boll in front of itself. I prefer to space the fingers 20 approximately one inch apart from each other, thus giving approximately 144 fingers per square foot of area of the connector.

It will now be seen in view of the foregoing that if a plurality of such fingers assembled on any member such as a board or belt is pushed through a cotton plant, it will penetrate the cotton plant with the fingers going around branches and pushing the leaves aside, but will engage and push cotton bolls in a desired direction, i.e., feeding them toward the fibers separating unit.

I have discovered that in order to be operative for the purposes intended, such movement of the resilient fingers should not be affected by the forward movement of the cotton picker since such movement would tend to bend the fingers disorganizing their intended action. In accordance with the invention, there are provided means adapted to produce movement of the resilient fingers through the cotton plant only in the direction transverse to the line of the cotton picker movement in the field. In other words, the resilient fingers 20 are moved through the cotton plant only transverse to the line of the cotton picker movement with said fingers having no movement longitudinally of the row of cotton plants or with respect to the embraced plant. Furthermore, in accordance with the invention after the feeding fingers bring a cotton boll in contact with the separating unit, their cotton-holding ends remain substantially at rest in spite of the forward movement of the cotton picker. This feature of the invention is of importance since I have discovered that for proper operation of the fibers separating unit there must be a period in which there is no relative motion between the cotton fibers and the bars of the fibers separating unit.

The above construction is attained by the provision of three sprocket wheels 25, 26 and 27. In the embodiment illustrated one of said sprocket wheels, namely, the sprocket wheel 27, is the driving wheel, with wheels 25 and 26 being idler wheels.

From an examination of Fig. 2 it will be noted that the arrangement of sprocket wheels 25, 26 and 27 is such that on the side of the connector toward the separating unit S between the wheels 25 and 26, said connector forms an angle, in the present embodiment equal to approximately 30°, with the line L—L. It will be noted that between the wheels 26 and 27 the connector is parallel to said line L—L. The angle which said connector 15 makes on the side toward row 12 with said line L—L is immaterial. In the embodiment illustrated it runs along a straight line between the wheels 27 and 25.

In accordance with the invention, the sprocket wheel 27 may be drivingly connected with wheels 10 in a manner, such as with the use of a suitable gear train, that the speed of the connector is determined by the forward motion of the tractor. It is of importance that the connector runs at such speed that in its portion between the wheels 25 and 26 the component of such speed along the line L—L is equal to the forward speed of the tractor, but has opposite direction. By virtue of such an expedient it is ensured that the fingers 20, upon engaging the cotton plant, will remain stationary longitudinally of the plant row and move only transversely thereof pushing the cotton balls toward the fibers separating unit S.

From an examination of Fig. 2, it will be seen that because of such a construction the connector 15 will run not only in its portion between the wheels 26 and 27 but also in its other portions at a speed somewhat greater than the forward speed of the tractor.

This condition may cause whipping action at the free ends of fingers 20, the root ends of which will move longitudinally rearwardly with respect to the separating unit, while their free ends are in contact with the separating unit and are stationary with respect to it. Such a condition would cause undesirable bending of the fingers due to unequal movement of their ends. Such bending of the fingers would cause the ends of the fingers to whip eventually and pull the cotton fibers from the bars of the separating unit, preventing engagement of the cotton fibers between bars.

In accordance with the invention, means are provided to eliminate the undesirable effect of such a tendency. Such means also operate to eliminate another undesirable tendency, namely, that of the springs tending to whip when going around the wheels 26 and 27. In the present embodiment of the invention such means are exemplified by mounting plates 18 on rotatable bars 30 journaled in bearings 31. The bearings 31 in which the bars 30 are journaled are secured to brackets 32 which in turn are secured to or are made a part of the upper chain 16 and move therewith. Cranks 33 are provided at the upper ends of the bars 30 with follower rollers 34 being provided on the upwardly bent free ends of said cranks 33. The followers 34 run in a cam track 35. The track 35 is provided along the chain 16 and is generally parallel but with said general parallelism or distance between the track 35 and said chain 16 being modified in a manner generally illustrated in Fig. 3a for the purposes explained below. The lengths of said cranks 33 and the distance of the track 35 from the chain 16 at various portions thereof are selected to control the angle which the fingers 20 form in such portions with respect to the plane of the chains 16 and 17, i.e. the general curved plane passed through the chains 16 and 17. As the track 35 comes closer or further away from the plane of the chains 16 and 17, it causes rotation of the cranks and, consequently, of the plates 18 carrying fingers 20, setting said fingers at a different angle with respect to the plane of the chains 16 and 17.

Figure 3A:
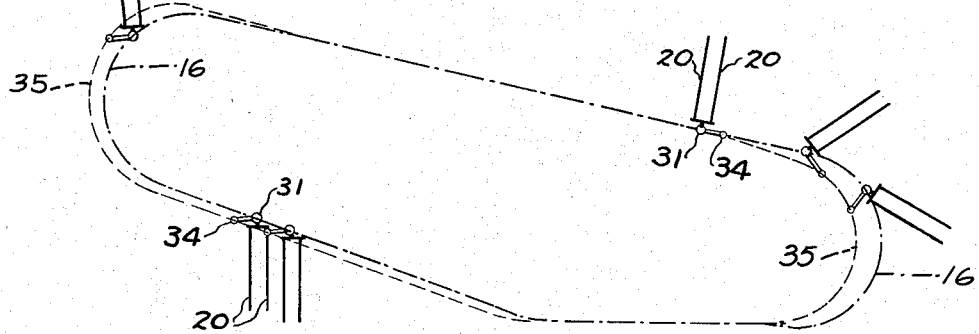
Fig. 3a is a diagrammatic plan view illustrating the track and means associated therewith operating to control the inclination of the boll feeding fingers with respect to the plane of the endless connector.

In accordance with the invention, the track 35 is arranged at the portion of the connector between the wheels 25 and 26 further outside of the plane of the chains, in consequence whereof the free ends of the fingers 20, see Fig. 3a, move rearwardly of their fixed ends causing said fingers to stand at an angle of approximately 60° to the plane of the chains 16 and 17 as is shown in Fig. 2. On the other hand, since said track is disposed at a shorter distance from the plane of the chains 16 and 17 in the portion of the connector between the wheels 26 and 27, the fingers first extend perpendicular to the plane of the chains 16 and 17 in said portion of the connector and then as the track again moves further inside of the plane of the chains 16 and 17, the fingers turn to have their free ends remain slightly forwardly with respect to their root ends, thus prolonging the period of contact of said free ends with the fibers separating unit. After the feeding fingers are withdrawn from contact with the cotton fibers, said fingers are made to swing rather rapidly in going over the wheel 27 and to come into more nearly perpendicular positions during the movement of said chain between the wheels 27 and 25. Fig. 3a illustrates the above space relationship in a diagrammatic manner. It will be appreciated from an examination of said figure that the controlling factor in the above operation is not the position of the track as such but the difference of its positions from the chains at the sprocket wheel and in the portions intermediate the same.

The fibers separating unit S comprises an endless connector or movable bar conveyor including an upper chain 40 and a lower chain 41, both running over the pair of sprocket wheels 42 and the pair 43 mounted on shafts 44 and 45, respectively. It will be understood that each of said shafts carries an upper and lower sprocket wheel with both of such wheels being indicated by the same numerals for the sake of clarity. The chains 40 and 41 carry a plurality of bars 46 which may be of semi-eliptical cross section or in general a cross section with one flat and one convex side as is best shown in Fig. 5. Between the chains 40 and 41 on the inside of the bars 46 there is provided an elongated support or housing comprising a vertically disposed wall or sheet metal fence, generally indicated by the numeral 50, of articulated shape illustrated in Fig. 5. In the portion of said housing or fence between points 51 and 52 thereof, which portion may be termed the "approach", the wall of the housing is inwardly disposed to define a recess or depressed section as indicated at 53 adjacent but spaced from the feeding unit and terminating on the righthand side thereof (in Fig. 5) at a lip 54. Thereupon, the fence 50 continues as a smooth metal surface curving in a plane parallel to the plane of chains 40 and 41 as they curve around the wheel 42 and then forming a chamber 57 covered with a housing 55. A suction conduit 56 is connected to said chamber 57. In other words, a housing 55 is disposed adjacent said second recess and defines therewith the chamber 57.

Figs. 7–10 illustrate the separation cycle during which the cotton fibers are separated from a hull. Referring to Fig. 2, it will be understood that the cotton plant illustrated therein enters, because of the forward movement of the cotton picker (downward in Fig. 2), a wedging entrance 60, whereupon fingers 20 begin their penetration moving substantially perpendicular to the line L—L but without moving longitudinally of said line.

As the cotton picker continues its movement, the point 51 reaches and passes the plant with one or more of the fingers 20 having engaged cotton boll as shown in Fig. 7. Because of the length of fingers 20, the cotton boll is pushed slightly beyond the bar 46 and into the recess 53. Held in such a manner the cotton fibers 100 reach the position indicated in Fig. 7. As the movement of the tractor continues, the bar 46 comes into the position illustrated in Fig. 8 with a portion of the cotton fibers indicated by the numeral 100a being pinched between the bar 46 and the surface of the fence 50.

The surface of the fence 50 in the separating portion 50a thereof may be relatively smooth. However, the character of such surface and the distance at which bars 46 slide over the same are so selected that while there is no rolling of cotton fibers between the bar 46 and the surface 50a, there is sufficient friction to retain the portion 100a of the cotton fibers in the position thereof indicated in Fig. 8.

As the movement of the cotton fibers 100 over said surface 50a continues, said fibers come into the position indicated in Fig. 9. In this position of the fibers 100, movement of the bar 46 away from the cotton boll begins at accelerated speed, while the cotton plant is held from following the bar 46 in such movement by a number of wires 65. Because of such a condition, with the cotton fibers 100 being pulled away while the plant is held by the wires, at a certain point, such as the one indicated in Fig. 9, separation of the cotton fibers 100 from the hull or bur 100b occurs.

The hull 100b is thus released from contact with the separating unit, while the fibers 100 are carried toward the chamber 57 formed by the housing 55. As soon as the fibers 100 pass the point 66, see Fig. 5, the bar 46 cannot hold them any longer, and the fibers drop into the chamber 57. The air current induced in said chamber by the action of the conduit 56 with the aid of a blower 67, which may be driven by motor 68 or with the aid of any other suitable means, carries the cotton into the conduit 56 to be deposited into a receptacle (not shown) provided in the cotton picker at any suitable place thereon.

The cotton picker constructed in accordance with the above disclosed concept shows unexpected effectiveness with very little tendency to cause foliage or branches of the cotton plan to be separated and carried into the cotton receptacle.

However, in accordance with the invention there are provided means operating to exclude branches and to decrease the tendency thereof toward engagement by the bars 46. In the present embodiment of the invention such means are represented by the strips of metal 70 provided in the recess 53 and arranged therein perpendicularly to the plane of the chains 16 and 17 and parallel to the direction of the cotton picker travel. Said strip 70 does not affect penetration of the cotton fiber past the bars 46 but greatly decreases and virtually eliminates similar penetration of the branches. Cooperating with the wires 65 such means are effective to exclude branches from penetrating into the recess 53. Strips of rubber 71 are arranged between the strips 70 and reach to less than half of the height of said strips, thus permitting cotton fibers to enter into the recess 53 and rub against the surface of said rubber strips to wrap more readily under the bars 46.

It will be understood that the cotton picker described above may under certain conditions require to be pulled over the same row more than once to pick substantially all the cotton from the cotton plants. The conditions affecting effectiveness of the cotton picker may be influenced by the density of cotton plant foliage, size of the cotton bolls, atmospheric conditions and the like.

There is thus provided an improved cotton picker whereby the objects of the present invention listed above and numerous additional advantages are attained.

I claim:
1. In a cotton picker, a cotton boll feeding unit and a fibers separating unit operatively associated with and laterally spaced from said feeding unit and defining therebetween a cotton plant passageway, said feeding unit including a flexible endless connector assembly operatively mounted for continuous movement along a closed path, a plurality of resiliently bendable horizontal boll feeding fingers mounted on said assembly in a brush-like arrangement and having free ends, said fingers being adapted to penetrate through and around the foliage of a cotton plant but to engage with their ends the cotton fibers when meeting cotton bolls and to push the bolls toward the fibers separating unit.

2. A cotton picking device comprising a movable boll feeding means, a fiber separating means operatively associated with said boll feeding means, said fiber separating means comprising a support having a depressed section and an elevated boll discharge section, a movable bar conveyor extending along said depressed and elevated sections whereby, when bolls of cotton are presented by said boll feeding means and pressed against said depressed section, said bars will engage the cotton bolls, move the same along to said elevated section where the bolls are separated from the cotton.

3. A cotton picking device comprising a movable boll feeding means and a fiber separating unit operatively associated with said boll feeding means, said movable boll feeding means being adapted to engage cotton bolls and to present them to said fiber separating unit for separation of cotton fibers from the hulls of said boll, said fiber separating unit comprising a support having a depressed section adapted to receive the boll presented by said boll feeding means and an elevated boll discharge section, a movable bar conveyor extending along said depressed section and elevated sections whereby, when bolls of cotton are presented by said boll feeding means and pressed against said depressed section, said bars will engage the cotton bolls, move the same along to said elevated section where the bolls are separated from the cotton, with the boll husks remaining on the cotton plants and the separated cotton fibers continuing their movement with said bars.

4. A cotton picking device comprising a movable boll feeding means and a fiber separating unit operatively associated with said boll feeding means, said movable boll feeding means being adapted to engage the cotton bolls and to present them to said fiber separating unit for separation of cotton fibers from the hulls of said bolls, said fiber separating unit comprising a support having a depressed section adapted to receive the bolls presented by said boll feeding means and an elevated boll discharge section, an endless conveyor including a plurality of vertically disposed horizontally spaced members and movable along said depressed and elevated sections whereby, when bolls of cotton are presented by said boll feeding means and pressed against said depressed section, said members will engage the cotton bolls as they approach said elevated section, move said bolls along said elevated section where the bolls are separated from the cotton, with boll husks remaining on the cotton plants and the separated cotton fibers moving with said members, and pneumatic means removing the cotton fiber from said members.

5. A cotton picking device comprising a movable boll feeding means and a fiber separating unit operatively associated with said boll feeding means, said movable boll feeding means being adapted to engage cotton bolls and to present them to said fiber separating unit for separation of cotton fibers from the hulls of said bolls, said fiber separating unit comprising a support having a depressed section adapted to receive the boll presented by said boll feeding means and an elevated boll discharge section, an endless conveyor including a plurality of vertically disposed horizontally spaced members and movable along said depressed and elevated sections whereby, when bolls of cotton are presented by said boll-feeding means and pressed against said depressed section, said members will engage the cotton bolls, move the same along said elevated section where the bolls are separated from the cotton, with boll husks remaining on the cotton plants and the separated cotton fibers moving with said members, a second depressed section on said support adapted to receive the cotton fibers for removal.

References Cited in the file of this patent

UNITED STATES PATENTS

| | | |
|---|---|---|
| 768,400 | Piper | Aug. 23, 1904 |
| 1,447,328 | Rycroft | Mar. 6, 1923 |
| 1,646,594 | Phelps et al. | Oct. 25, 1927 |
| 1,786,851 | Johnston et al. | Dec. 30, 1930 |
| 2,025,514 | Johnston | Dec. 24, 1935 |
| 2,200,464 | Berry | May 14, 1940 |
| 2,668,410 | Bramblett | Feb. 9, 1954 |
| 2,692,469 | Smith | Oct. 26, 1954 |
| 2,713,240 | West | July 19, 1955 |
| 2,776,534 | Sanders | Jan. 8, 1957 |
| 2,783,603 | Smith et al. | Mar. 5, 1957 |
| 2,815,635 | Shannon | Dec. 10, 1957 |
| 2,817,939 | Graham et al. | Dec. 31, 1957 |